United States Patent [19]
Hoffman, Jr.

[11] 3,957,559

[45] May 18, 1976

[54] CHEMICALLY FILLED POLYMERIC ARTICLES

[75] Inventor: Henry Tice Hoffman, Jr., Trenton, N.J.

[73] Assignee: American Can Company, Greenwich, Conn.

[22] Filed: July 8, 1974

[21] Appl. No.: 486,563

Related U.S. Application Data

[60] Division of Ser. No. 253,775, May 16, 1972, Pat. No. 3,849,168, which is a continuation-in-part of Ser. No. 868,626, Oct. 22, 1969, abandoned.

[52] U.S. Cl.................................... 156/254; 55/158; 55/387; 156/344; 260/37 R; 260/42; 427/248; 427/289
[51] Int. Cl.² ......................................... B32B 31/18
[58] Field of Search..................... 156/1, 344, 254; 117/106 A, 68, 106 R, DIG. 3, 107.2 R, 68, 107, 47 A, 138.8 E; 210/23; 55/158, 16, 387, 389; 264/134, 136; 427/289; 260/37 R, 41 R

[56] References Cited
UNITED STATES PATENTS

| | | | |
|---|---|---|---|
| 448,915 | 3/1891 | Erlwein | 117/DIG. 12 |
| 2,771,378 | 11/1956 | Motter | 117/47 |
| 2,801,447 | 8/1957 | Wolinski | 264/136 |
| 2,919,207 | 12/1959 | Scholzel | 117/236 |
| 3,294,059 | 12/1966 | Barnes et al. | 117/47 A |
| 3,401,126 | 9/1968 | Miller et al. | 252/514 |
| 3,513,020 | 5/1970 | West | 117/138.8 |

*Primary Examiner*—Edward G. Whitby
*Attorney, Agent, or Firm*—Robert P. Auber; Ernestine C. Bartlett; George P. Ziehmer

[57] ABSTRACT

Solid gas-permeable synthetic polymeric articles are chemically filled with a filler compound formed in situ. These deposits are produced by diffusing one or more diffusion compounds into a solid gas-permeable polymer and reacting or decomposing the diffusion compound(s) to form deposits throughout the article. The compounds may be preferentially deposited in a planar zone of sheet material in an amount sufficient to cause the sheet to split.

8 Claims, No Drawings

CHEMICALLY FILLED POLYMERIC ARTICLES

CROSS-REFERENCE TO RELATED APPLICATION

This is a division of application Ser. No. 253,775 filed May 16, 1972, now U.S. Pat. No. 3,849,168 dated Nov. 19, 1974, which is a continuation-in-part of application Ser. No. 868,626, filed Oct. 22, 1969, now abandoned.

BACKGROUND OF THE INVENTION

Solid synthetic polymeric articles are often gas-permeable and/or permit solvent diffusion through the polymer. The rate of transmission of gases and/or solvent through such polymers varies for different materials and the rate also may vary for materials produced by different manufacturing processes. It is often desired to minimize or totally eliminate such transmission. Mechanical filling of polymers has been attempted to reduce permeability with some effect. This has been accomplished by mechanically admixing a filler material with the resin and then fabricating the finished product. Such mechanical filling is on a macro scale and affects the properties of the polymer.

It is an object of the present invention to provide chemically filled polymers wherein the filler material is deposited throughout the article. This provides an article having improved or different properties, i.e., different gas and/or solvent permeability, electrical properties, chemical properties and/or physical properties.

SUMMARY OF THE INVENTION

The present invention provides chemically filled solid synthetic polymeric articles containing solid micro-deposits throughout the article. The solid micro-deposits are filler compounds which are deposited from one or more diffusion compounds which are diffused into the solid gas-permeable synthetic polymeric article.

The present invention also provides a process for filling continuous, solid gas-permeable synthetic polymeric articles comprising diffusing at least one diffusion compound, and preferably two diffusion compounds individually from opposite sides of the article, thereinto, and then transforming said diffusion compounds into an immobile deposit in said solid polymeric article.

The invention further provides a process for splitting a solid gas-permeable synthetic polymeric sheet comprising diffusing a diffusion compound into a gas-permeable polymeric sheet and depositing a solid deposit from said diffusion compound in at least one planar zone of said sheet in an amount sufficient to split said sheet along said zone.

DETAILED DESCRIPTION OF THE INVENTION

Gas and/or solvent permeability of solid synthetic polymeric articles is most often considered in the context of articles having relatively thin sections such as film, sheet, and wall sections of containers such as bottles. The present invention is particularly directed to articles of this nature insofar as it provides articles having substantially reduced gas and/or solvent permeability. The chemical filling may be accomplished to provide an article having specified physical, chemical, and/or electrical properties. In such instances, the design and size of sections of the filled polymeric article may vary widely.

The chemically filled synthetic polymeric articles of the present invention may be prepared from such solid gas-permeable polymers as polymeric fluorohalocarbon e.g. trifluorochloroethylene, and ionomer, notably an ionic copolymer of ethylene and an alpha-beta-unsaturated carboxylic acid such as methacrylic acid in which the acid is partially neutralized to form a salt such as the zinc salt, polyamide, polycarbonate, polychloroprene, polyester, polyethylene, polypropylene, polystyrene, polyvinylchloride, rubber hydrochloride, silicone polymers, and copolymers thereof. Chemically filled polyethylene, polypropylene, polyvinylchloride, silicone and polycarbonate articles are of particular utility.

The solid gas-permeable synthetic polymeric articles are chemically filled by diffusing at least one chemical compound into the polymeric articles and transforming said compound into a solid filler compound deposited in the micro-interstices thereof. These filler compounds are preferably inert, innocuous materials to produce gas-impermeable articles. For the purposes of the present invention, it is not necessary to determine the physical state, when deposited, of the compound making up the filler deposits. However, the deposits are immobile and of a compound which is a solid when in bulk, and the amount and chemical nature of the deposits may be confirmed by careful weighing of the filled polymer shape (after outgassing and cleaning its surfaces), and by analytical procedures such as infrared spectroscopy, as indicated in the examples hereinbelow. Neither is it necessary to determine the dimensions of the "micro-interstices" within which the deposits form; since as disclosed hereinbelow the bodies to be filled are continuous thin shapes of apparently homogeneous solid polymer, the interstices filled by the deposits must be of microscopic or even molecular dimensions, and the filler material formed therein thus may be designated at least initially as "micro-deposits."

A "filler compound" deposit may be formed by reacting two compounds in the solid polymeric article as a matrix. The two compounds may be diffused in from opposite sides of the article or may be diffused sequentially from the same side. One of the said compounds, e.g., atmospheric oxygen or water vapor, may be diffused in the solid polymeric article as a result of atmospheric exposure after the first compound is diffused in. Such reactions and concomitant deposition on a micro scale are illustrated in the following equations.

$NH_3 + HCL \rightarrow NH_4Cl$ $SiCl_4 + 6NH_3 \rightarrow Si(NH)_2 + 4NH_4Cl$ $SiCl_4 + 2H_2O \rightarrow SiO_2 + 4HCl$ $TiCl_4 + 2H_2O \rightarrow TiO_2 + 4HCl$ $2Al[CH_2CH(CH_3)_2]_3 + 39O_2 \rightarrow Al_2O_3 + 24CO_2 + 27H_2O$ $2Ni(CO)_4 + O_2 \rightarrow 2NiO + 8CO$ $Ni(CO)_4 \xrightarrow{heat} Ni + 4CO$ Useful filler compounds include the halides and oxides of metals. The said metals are preferably the Group III A metals, especially aluminum and boron; the Group IV metals especially tin and silicon (Group IVB) and titanium (Group IVA); and the transition metals in Groups other than Groups III and IV, e.g. nickel, iron, etc. (Group VIII).

The diffusion of a decomposable compound into the permeable polymer article and subsequent decomposition is illustrated by the diffusion of nickel carbonyl with decomposition (in the absence of oxygen) to deposit nickel as a filler. For purposes of the present application, deposition of a filler element is included as a species of a filler compound and is encompassed by said term.

The compounds which are diffused into the solid gas-permeable polymer, referred to herein as "diffusion compounds", are exposed to the surface of the solid gas-permeable polymer in their gaseous or liquid state. The preferred compounds are those that are in the gaseous state and those liquids having a substantial vapor pressure under the applied process conditions as for example, slicon tetracloride, a fuming liquid at room temperature.

The compounds which may be utilized to form the deposited filler compound are those that will diffuse into the solid gas-permeable polymeric article. They should not degrade the polymeric article and, therefore, preferably should not react with a solid matrix.

The mechanism by which compounds diffuse into solid gas-permeable polymeric materials is not definitively known. The solid polymeric materials, which are treated in accordance with the invention, are apparently uniform — that is, apparently homogeneous — solid bodies. The examples set out hereinbelow utilize extruded thermoplastic material in sheet form, or utilize "Boston round" bottles of thermoplastic material molded conventionally in tubular shapes, and are of uniform solid structure.

The mechanisms by which gases, or the vapors from volatile liquids, may penetrate into or pass through solid bodies are generally well recognized. Such mechanisms are discussed, for example, by Yasuda and Stannet in *Encyclopedia of Polymer Science and Technology*, Interscience Publishers, New York (1965), volume 2, in a section on vapor barriers, pages 316–317. Porous media such as paper, fabrics, foamed plastics, and some cellulosic membranes permit permeation by capillary or convective flow through pores and canals. However, homogenous films of polymeric materials require a pressure difference, or gradient of partial pressure, of the vapor involved, the mechanism of transmission of vapor through the film thus being of the diffusion type. While some solid polymeric sheets appear to have strata of different diffusion characteristics (discussed hereinbelow), they are nevertheless solid throughout, and free of pores which would permit capillary or convective flow. As used herein, the term "solid polymeric article" will be understood to refer to polymeric materials of essentially uniform nonporous structure in which vapor permeation occurs through a diffusion mechanism.

Various mechanisms have been postulated which include diffusion in apparently solid homogeneous material along boundaries between adjacent and similarly oriented crystal structures; between adjacent and dissimilarly oriented crystal structures; through or along lattice discontinuities; through regions of non-oriented or amorphous material; and by vacancy migration. The art sometimes has referred to solid gas-permeable polymeric materials, which will over a period of time permit passage (by diffusion) of gases and sometimes of solutions, as being micro-porous. The definitively known facts are limited to the knowledge that solid gas-permeable polymeric materials permit diffusion of gaseous compounds and certain volatile compounds in the liquid state when in contact therewith. These compounds, which are diffused into and through the solid gas-permeable polymers, are referred to herein as diffusion compounds. The actual physical state of such diffusion compounds in the solid gas-permeable polymer matrix is not definitively known.

The phrase "transforming said diffusion compound into solid material deposited in said solid polymeric article" includes formation of solid by chemical means, e.g., as a reaction deposit, by decomposition, etc.

These considerations affect the uniformity or non-uniformity of the deposit of filler compound throughout the polymeric article. Non-uniform deposition may be achieved when filling polymeric articles having portions of different cross section size and/or orientation and/or structure.

Filler compound may also be deposited in a non-uniform manner through such apparently uniform solid polymeric articles as sheet and film. The obtention of non-uniform filling resultant from non-uniform structure is illustrated by polyethylene which is considered to have both crystalline and amorphous regions. It has been postulated that diffusion occurs through the amorphous regions. Accordingly, it would be expected that the micro-deposition is preferential in the areas in which there is the largest amount of diffusion of the diffusion compound. Non-uniformity may be effected by controlling the conditions under which the diffusion compound is diffused into the polymeric article.

The present invention has provided evidence that extruded polyethylene film is built up of multiple well defined lamellar layers of crystalline material. Under selective conditions it is possible to preferentially form deposits in at least one layer parallel to the surface of the film. It is postulated that the deposit is formed in a region between layers of more crystalline material. The deposition can be continued until sufficient filler compound has been deposited to cause the polyethylene film to split into layers along the deposition zone. The thickness of the polyethylene layer(s) split off from the film can be controlled by varying the process conditions. In this instance, the initial micro-deposits of filler material increase to become macro-deposits.

The procedure may be utilized for forming non-uniform deposits with maximum concentration of filler compound at several different sites in the polymeric article by sequentially varying the deposition conditions.

The chemical filling is resultant from the diffusion and subsequent reaction of the diffusion compound or compounds to deposit a solid filler throughout the solid gas-permeable synthetic polymeric article. The term "throughout" refers to the contiguous gas-permeable regions of the polymeric article into which the diffusion compound is diffused.

The temperature of the solid gas-permeable polymeric article when the diffusion compound is diffused into the article may vary from ambient temperatures or even refrigerated temperatures up to elevated temperatures. The elevated temperatures should not be sufficiently high to cause distortion of the solid polymeric article.

The rate of diffusion of the diffusion compound into and through the solid gas-permeable polymeric article and the consequent amount and situs of filler compound deposited are affected by the pressure of the diffusion compound at the exposed surface of said solid gas-permeable polymeric article. For most diffusion compounds, the higher the pressure and the higher the temperature, the greater the diffusion rate into the solid g -permeable polymeric article. When the diffusion compound is in a mixture or solution, agitation of said mixture or solution tends to increase the diffusion rate into the solid gas-permeable polymeric article. The molecular size of the diffusion compound and the solubility thereof in the solid gas-permeable polymeric article also affect the diffusion rate and amount of filler compound deposited. It will appear, as suggested hereinabove, that a substantial period of time is required to permit passage by diffusion of reaction compounds well into the interior of even thin homogeneous bodies; the examples set out hereinbelow indicate that a treatment period of the order of an hour or more is required for the time to be sufficient to permit substantial diffusion into the body.

As indicated hereinabove, the solid polymeric articles utilized in accordance with the invention are thin, continuous, and apparently homogeneous or uniform bodies of solid gas-permeable synthetic polymer. The invention is further illustrated by the following examples. All parts and percentages throughout the application are by weight unless otherwise specified.

EXAMPLE 1

Disc-shaped samples 6 inches in diameter of a low density polyethylene film, extruded with a nominal thickness of 4 mils, were filled with ammonium chloride by reacting ammonia and hydrogen chloride. An impregnation cell was made from two 5-inch glass funnels. The lips of the funnels were ground to provide a flat surface and the cell was formed by clamping the lips of the funnels together. For impregnation, a disc of the polyethylene film, sandwiched between rubber gaskets, was clamped between the lips of the funnels to form two compartments within the cell. Streams of hydrogen chloride and ammonia were run into the opposite chambers at atmospheric pressure. Thus the two diffusion compounds, which react within the body of polymeric material to form the filler compound, are diffused into the body individually from opposite sides thereof. Gas flow was maintained during impregnation. Samples were prepared with various impregnation times. Sample weight gains were determined, and gas-transmission rate (GTR) measurements were made by the Dow Cell Method (ASTM D-1434-66). Infrared spectral studies were made of the filled product.

After impregnation, samples appeared to have taken on a somewhat hazy appearance and there were a few sites where there appeared to be light crystalline deposits. Infrared spectra of the samples gave positive confirmation of the presence of ammonium chloride. Examination of the surface of the filled polyethylene film was made with a scanning microscope and determined that the filling causes a marked change in surface topography. The unfilled control had a relatively smooth surface. Elliptical or oval craters (or elevations) were present in the surface of the filled film.

The weight gain, and GTR data for carbon dioxide and oxygen, of the ammonium chloride-filled film are reported in the following table:

| Sample | Filling Time (hr.) | Weight Gain (mg.) | GTR (cc.STP/m²/24 hr/atm) | | | |
|---|---|---|---|---|---|---|
| | | | $CO_2$ | %Red* | $O_2$ | %Red* |
| Control | | | 18,740 | | 4,120 | |
| 1 | 18 | 226.2 | 1,975 | 89 | 448 | 89 |
| 2 | 6 | 102.0 | 2,770 | 85 | 236 | 94 |
| 3 | 7 | 186.3 | 1,280 | 93 | 66 | 98 |
| 4 | 7 | 188.7 | 999 | 95 | 228 | 94 |

* % reduction = $\dfrac{GTR_{(control)} - GTR_{(sample)}}{GTR_{(control)}}$

STP - standard temperature and pressure

EXAMPLE 2

The splitting of polyethylene film under varying process conditions was accomplished using a steel cell for diffusing reactive gases nder regulated pressure into the film from opposite sides. Pressures of the reactive gases were independently controllable. A 4 mil film of polyethylene extruded resin was filled with ammonium chloride. Ammonia and hydrogen chloride were applied to opposite sides of the film for a period of 4 hours for Samples 1–2 and 4–6 and a period of 16 hours for Sample 3. In each instance reported herein, the 4 mil film was split into two layers. The thickness of each of these layers in mils (thousandths of an inch) and the pressure of the ammonia and hydrogen chloride are reported in the following table:

| Sample | $NH_3$ Press. (psig.) | HCl Press. (psig.) | Thickness of Layers | |
|---|---|---|---|---|
| | | | $NH_3$ side | HCl side |
| 1 | 16 | 16 | 2.3 | 1.6 |
| 2 | 16 | 10 | 2.6 | 1.4 |
| 3 | 16 | 2.5 | 2.8 | 1.0 |
| 4 | 7 | 5 | 2.1 | 1.5 |
| 5 | 2.5 | 7.5 | 2.0 | 1.7 |
| 6 | 2.5 | 16 | 1.8 | 2.1 |

EXAMPLE 3

Boston round bottles (2 ounce) of low density polyethylene were chemically filled by exposure to silicon tetrachloride vapors on the outside and ammonia vapors on the inside for about 65 hours. Diffusion of carbon tetrachloride through the treated bottle and through a control resulted in a transmission rate of 0.2 gram per day for the treated bottle compared with 2 grams per day for the untreated bottle.

EXAMPLE 4

Boston round bottles (2 ounce) of low density polyethylene were filled with Ti(iPrO)$_4$. The bottles were capped. The diffusion rate for the titanium isopropoxide was 1.4 mg. per day. Hydrolysis of the Ti(iPrO)$_4$ on contact with water vapor in the polymer wall or at the outer side yields $TiO_2$.

Other bottles were filled with carbon tetracloride containing a small amount of Ti(iPrO)$_4$. After standing for 22 days, the bottle sidewalls did not show signs of paneling (inward collapse). Identical bottles filled with the same amount of carbon tetrachloride only show signs of paneling after 22 days.

EXAMPLE 5

Boston round bottles (2 ounce) of the type used in Examples 3 and 4 were filled with $B(iPrO)_3$ and capped. The diffusion rate of the boron isopropoxide was 3.1 mg. per day. After standing for some days, a white deposit was observed on the outside of the bottle establishing that the compound had diffused through the body wall and had hydrolized at the outside wall surface. Hydrolysis in the polyethylene matrix would yield therein the same white boron oxide filler compound.

Diffusion of compounds into other solid gas-permeable polymers such as high density polyethylene, polypropylene, polyvinyl chloride, silicones, and polycarbonates results in chemically filled synthetic polymeric articles such as those illustrated in the examples.

Although the examples generally have utilized percentage reduction of the gas-permeability as a measure of the chemical filling, the process of the present invention also produces chemically filled synthetic polymeric articles having different physical, electrical, and/or chemical properties than the solid gas-permeable polymer from which the filled article was prepared. The changed physical properties are illustrated by the increase of compressive strength as a result of the chemical filling. Deposition of a filler compound such as tin oxide or nickel oxide or nickel metal may change the electrical properties. Chemically filled articles of the present invention may be filled with a chemical which upon exposure to a specified atmosphere slowly reacts with the said atmosphere and provides controlled release of the consequent reaction product.

The foregoing illustrate the versatility of the process of the present invention and of the novel chemically filled products produced thereby.

What is claimed is:

1. A process for splitting solid gas-permeable polyethylene sheets comprising contacting at least one surface of said polymeric sheet with at least one diffusion compound in the gaseous state for a period of time sufficient to diffuse said compound into said gas-permeable sheet and deposit immobile material therefrom in at least one planar zone of said sheet in an amount sufficient to split said sheet along said zone.

2. The process of claim 1 wherein a gaseous compound is diffused through one side of said sheet and a second gaseous compound is diffused through the opposite side of said sheet, and said compounds are reacted to form said immobile material.

3. The process according to claim 2 wherein said gaseous compounds are ammonia and hydrogen chloride.

4. A process for splitting a continuous, apparently homogeneous solid gas-permeable polyethylene sheet comprising the step of contacting said sheet with a diffusion compound in the gaseous state for a period of time sufficient to diffuse said compound into said gas-permeable sheet and depositing an immobile material from said diffusion compound in a planar zone of said sheet, said immobile material being formed by decomposition of said diffusion compound or by reaction thereof with atmospheric moisture or oxygen and being deposited in an amount sufficient to effect separation of layers of said sheet along said zone.

5. The process of claim 1 wherein a single diffusion compound is diffused into said sheet and said immobile material is formed by decomposition within said planar zone of said diffusion compound.

6. The process of claim 1 wherein a single diffusion compound is first diffused into said sheet and said immobile material is formed by reaction of atmospheric moisture or oxygen with said compound within said planar zone.

7. The process of claim 5 wherein said diffusion compound is nickel tetracarbonyl.

8. The process of claim 6 wherein said diffusion compound is silicon tetrachloride or titanium tetrachloride.

* * * * *